United States Patent
Mukherji et al.

(10) Patent No.: US 12,524,760 B2
(45) Date of Patent: Jan. 13, 2026

(54) TOKEN TRANSFER VIA MESSAGING SERVICE OF WALLET APPLICATION

(71) Applicant: Coinbase, Inc., Oakland, CA (US)

(72) Inventors: Rishav Mukherji, Bedford, NH (US); Stavros Lee, Oakland, CA (US); Yi-Ju Chung, San Jose, CA (US); Adam Kopec, Pine Plains, NY (US); Logan Schmid, New York, NY (US)

( * ) Notice: Subject to any disclaimer, the term of this patent is extended or adjusted under 35 U.S.C. 154(b) by 151 days.

(21) Appl. No.: 18/341,557

(22) Filed: Jun. 26, 2023

(65) Prior Publication Data

US 2024/0428237 A1  Dec. 26, 2024

(51) Int. Cl.
  *G06Q 20/38* (2012.01)
  *G06Q 20/36* (2012.01)
  *H04L 9/32* (2006.01)

(52) U.S. Cl.
  CPC ....... *G06Q 20/386* (2020.05); *G06Q 20/3676* (2013.01); *G06Q 20/389* (2013.01); *H04L 9/3213* (2013.01); *G06Q 20/3829* (2013.01)

(58) Field of Classification Search
  None
  See application file for complete search history.

(56) References Cited

U.S. PATENT DOCUMENTS

| | | | | |
|---|---|---|---|---|
| 10,796,294 | B2 * | 10/2020 | Van Os | G06Q 20/102 |
| 2020/0092292 | A1 * | 3/2020 | Patel | G06F 21/602 |
| 2020/0320518 | A1 * | 10/2020 | Simas | H04L 9/3247 |
| 2021/0166221 | A1 * | 6/2021 | Noh | G06Q 20/3825 |
| 2022/0207118 | A1 * | 6/2022 | Bernardi | H04L 51/18 |
| 2023/0186292 | A1 * | 6/2023 | Higgins | G06Q 20/36 705/64 |
| 2023/0419276 | A1 * | 12/2023 | Agarwal | G06Q 20/3821 |
| 2024/0104525 | A1 * | 3/2024 | Holisky, Jr. | G06Q 20/0655 |
| 2024/0261692 | A1 * | 8/2024 | Sliwka | H04L 9/3213 |
| 2024/0281796 | A1 * | 8/2024 | Finlow-Bates | G06Q 20/405 |
| 2024/0378648 | A1 * | 11/2024 | Holbrook | H04W 12/06 |
| 2024/0420129 | A1 * | 12/2024 | Ramde | G06Q 20/389 |

OTHER PUBLICATIONS

Matt Galligan, "Secure Web3 Messaging for Wallet Apps with XMTP", Sep. 12, 2022 (Year: 2022).*
SimpleSwap, "Messengers Integrating Payments", Nov. 29, 2022 (Year: 2022).*

* cited by examiner

*Primary Examiner* — Jacob C. Coppola
*Assistant Examiner* — Timothy Paul Sax
(74) *Attorney, Agent, or Firm* — Holland & Hart LLP

(57) ABSTRACT

Methods, systems, and devices for data management are described. A wallet application may display one or more messages sent via a messaging service from a second user at a first user interface associated with a first user. The first user interface may receive one or more inputs to initiate a process for sending a crypto token to the second blockchain address of the second user. The wallet application may broadcast a message configured to transfer the crypto token from the first blockchain address to the second blockchain address via a blockchain network associated with the crypto token. The wallet application may update the first user interface to indicate the broadcasted message via the blockchain network. As such, users of the wallet application may transfer crypto tokens from a blockchain address via a blockchain network while, in a same user interface, sending and receiving messages via a messaging service.

19 Claims, 10 Drawing Sheets

TOKEN TRANSFER VIA MESSAGING SERVICE OF WALLET APPLICATION

FIELD OF TECHNOLOGY

The present disclosure relates generally to data management, including techniques for token transfer via messaging service of wallet application.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Figure 1:
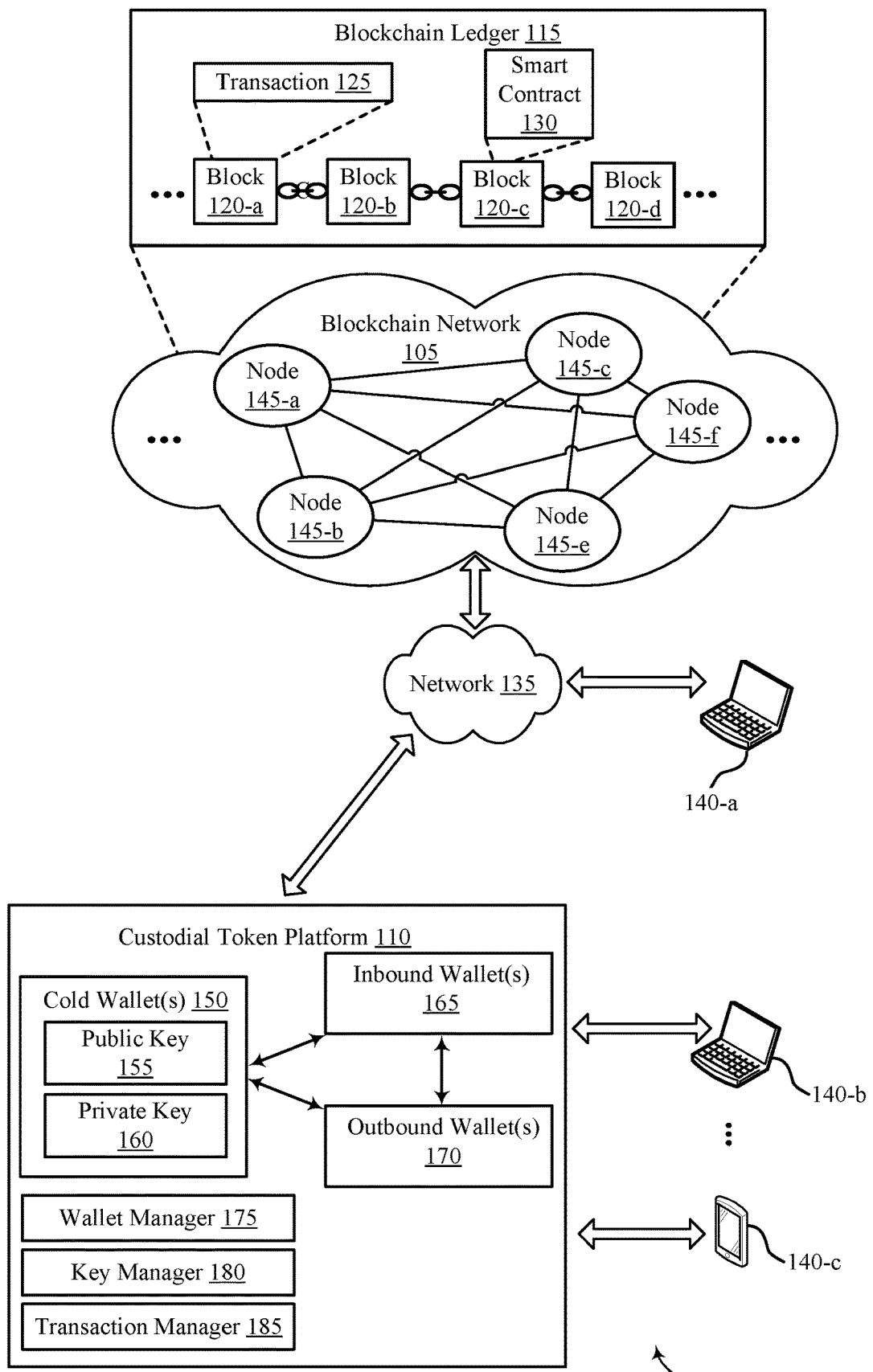
FIG. 1 illustrates an example of a computing environment that supports token transfer via messaging service of wallet application in accordance with aspects of the present disclosure.

A wallet application may be used to store digital assets, such as crypto tokens, that are supported by blockchain networks. The wallet application, which may be referred to as a digital asset wallet, may utilize public key cryptography and therefore may be associated with one or more public keys that are used to receive digital assets and one or more private keys that are used to sign transactions or messages that are used to transfer digital assets, among other blockchain functionality. In some examples, a wallet application may be non-custodial such that the user may have access to the private keys associated with the public key. Additionally, or alternatively, a wallet application may support multi-party computation (MPC) techniques such that the wallet application has access to a portion (e.g., shard) of a private key. In some cases, the user may send and receive messages and perform transactions via a messaging service. However, in some cases, a user may not send or receive messages and perform transactions on a wallet application supporting transactions of digital assets such as crypto tokens or non-fungible tokens.

Techniques described herein support a wallet application that allows a user to leverage a messaging service to send and receive both messages and digital assets, such as crypto tokens via the wallet application. For example, a wallet application may display, at a first user interface associated with a first user, one or more messages from a second user, where the one or more messages are sent from the second user to the first user via the messaging service. In some examples, the messaging service may exchange the one or more messages between the first user and the second user based on a respective blockchain address associated with each user. That is, the messaging service may route the one or more messages from the first user associated with a first blockchain address to the second user associated with a second blockchain address based on the second blockchain address.

The first user interface may receive one or more inputs to initiate a process for sending a crypto token to the second blockchain address of the second user. For example, the first user may input, at the first user interface, one or more inputs including an amount of a crypto token, a selection of a crypto token, or both to send to the second user. The wallet application may broadcast a message via a blockchain network associated with the crypto token. The message may be configured to transfer the crypto token from the first blockchain address to the second blockchain address. The first user interface, a second user interface associated with the second user, or both may be updated to indicate the progress of the transfer. For example, the transfer may be indicated as one of "pending," "sent," or "failed" based on a status of the transaction from the blockchain network. As such, the techniques described herein may enable users of the wallet application to transfer crypto tokens from a blockchain address via a blockchain network while, in a same user interface, sending and receiving messages via a messaging service that is supported by a decentralized messaging protocol that also leverages the blockchain addresses.

FIG. 1 illustrates an example of a computing environment 100 that supports token transfer via messaging service of wallet application in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the computing system custodial token platform 110, the blockchain network 105, or both. For example, a user of the computing device 140-*a* may provide user inputs via the computing device 140-*a*, which may result in commands, data, or any combination thereof being communicated via the network 135 to the computing system custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

Techniques described herein support a wallet application that allows a user to leverage a messaging service to send and receive both messages and digital assets, such as crypto tokens, via a user interface of the wallet application. For example, the techniques described herein may be applicable to a self-custody or MPC wallet accessible via one or more of the user devices 140. A first user interface may receive, from a first user, one or more inputs to initiate a process for sending a crypto token to a second blockchain address of a second user. The wallet application may broadcast a message via a blockchain network associated with the crypto token, where the message is configured to transfer the crypto token from the first blockchain address to the second blockchain address. The first user interface, a second user interface associated with the second user, or both may be updated to indicate the progress of the transfer. As such, the techniques described herein may enable users of a messaging service of a wallet application to transfer or initiate transfer of crypto tokens from a blockchain address via a blockchain network while, in a same user interface, sending and receiving messages via a messaging service.

Figure 2:
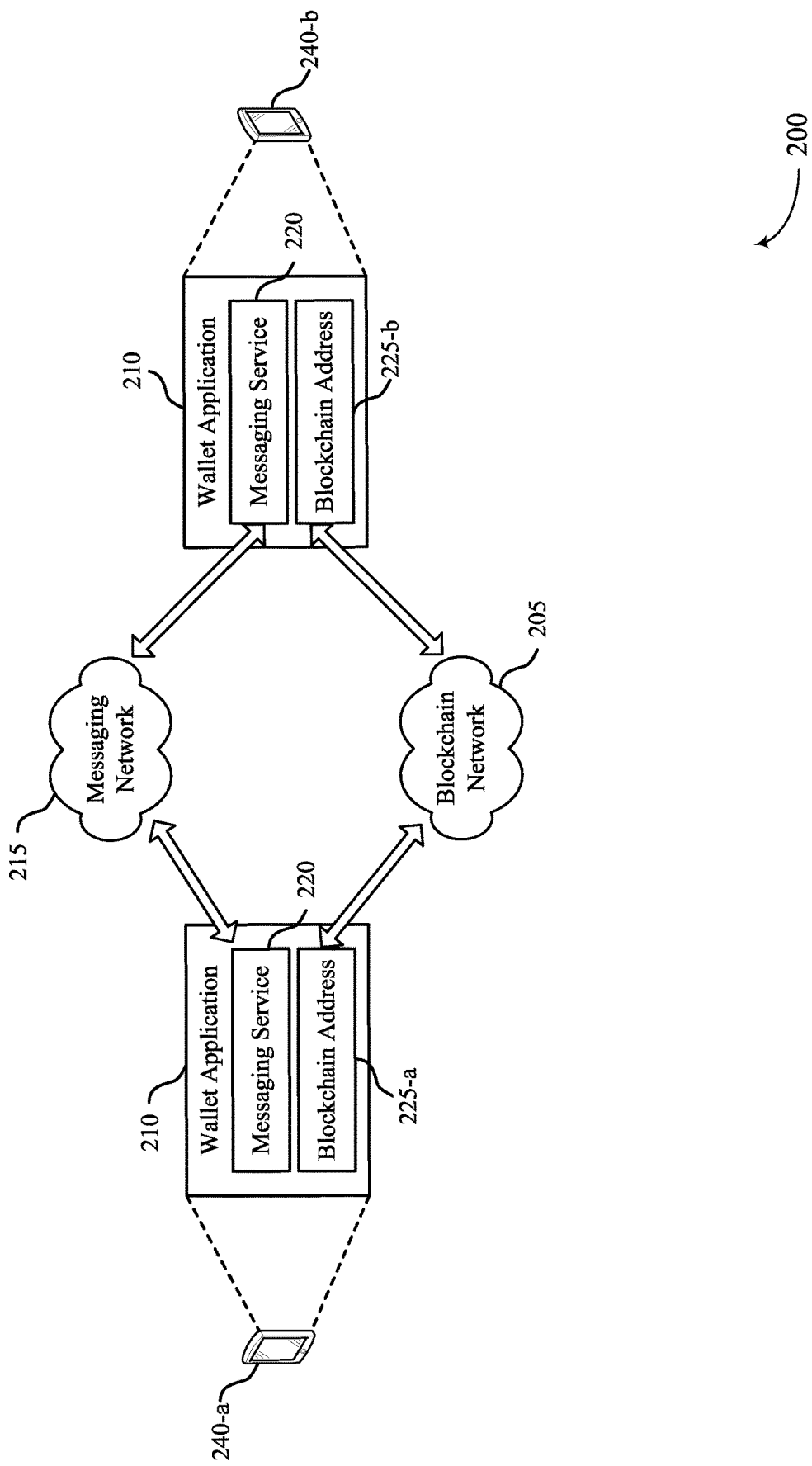
FIG. 2 shows an example of a computing environment that supports token transfer via messaging service of wallet application in accordance with aspects of the present disclosure.

FIG. 2 shows an example of a computing environment 200 that supports token transfer via messaging service of wallet application in accordance with aspects of the present disclosure. The computing environment 200 may include a blockchain network 205, a user device 240-*a*, and a user device 240-*b*, which may be examples of corresponding devices or systems as described with respect to FIG. 1.

The user device 240-*a*, the user device 240-*b*, or both may include a wallet application 210, including a messaging service 220 supporting a decentralized messaging protocol. For example, the wallet application 210 may enable users with devices including the wallet application 210 to send and receive messages with other devices including the wallet application 210 via a decentralized messaging protocol, such as Extensible Message Transport Protocol (XMTP). It should be understood that the techniques described herein may be applicable to other messaging protocols and to multiple blockchain networks. In some examples, messages may be sent or received (e.g., exchanged) via a messaging network 215 that implements or supports the decentralized messaging protocol.

The wallet application 210 associated with the user device 240-*a* and the user device 240-*b* may include a blockchain address 225-*a* and a blockchain address 225-*b*, respectively. For example, the wallet application 210 may be configured with the blockchain address 225-*a* for a first user of the user device 240-*a*, where the blockchain address 225-*a* may be one of a quantity of blockchain addresses for the first user. That is, the wallet application 210 may support multiple blockchain addresses per device, and the user may switch between the blockchain addresses via the user interface.

The messaging service 220 may display messages at a first user interface associated with the user device 240-*a*, a second user interface associated with the user device 240-*b*, or both, according to the blockchain address 225-*a* and the blockchain address 225-*b* configured for the wallet application 210 at each device. That is, the messaging service 220 may associate messages exchanged via the messaging network 215 with a blockchain address and display the messages to users accordingly. Thus, as a user switches between blockchain addresses, the wallet application may retrieve and display the corresponding messages.

In some examples, the first user may input a blockchain address (e.g., different from the blockchain address 225-*a*) to the wallet application 210. For example, the first user may input a seed phrase associated with the blockchain address such as to add the blockchain address to the wallet application. In such cases, the first user interface associated with the user device 240-*a* may display messages associated with the blockchain address. For example, the first user interface may display the messages associated with the blockchain address input by the user via the messaging service 220 (e.g., the decentralized messaging protocol).

The user device 240-*a*, the user device 240-*b*, or both may use the messaging service 220 of the wallet application 210 to send and receive (e.g., exchange) one or more messages and transfer (e.g., send) crypto tokens. For example, the first user of the user device 240-*a* may send a first message to the blockchain address 225-*b* via the messaging network 215, where the messaging network 215 sends (e.g., routes) the first message to the user device 240-*b* according to the blockchain address 225-*b* configured in the wallet application 210 of the user device 240-*b*. That is, the messaging network 215 may utilize one or more blockchain addresses to support an exchange of the one or more messages between users of the wallet application 210 including the messaging service 220.

In some examples, the first user, the second user, or both may input messages to the messaging service 220 via a user interface element that causes display of a digital keyboard. For example, the users may input characters for a message via selecting and using the user interface element.

The messaging service 220, in addition to enabling the exchange of the one or more messages, may enable the first user, the second user, or both to send one or more crypto tokens. For example, a user interface of the messaging service may indicate an option to send the one or more crypto tokens. The first user of the user device 240-*a* may select the option to send the one or more crypto tokens and provide one or more inputs including a crypto token, an amount of a crypto token, or a combination thereof to send to another user (e.g., a user of the user device 240-*b*). That is, the first user of the user device 240-*a* may send the one or more crypto tokens from the blockchain address 225-*a* to the blockchain address 225-*b*.

In some cases, the first user may input a crypto token that may be associated with a gasless transaction. For example, the wallet application 210 may determine that the crypto token is a crypto token type that is transferrable without incurring transfer fees (e.g., gasless) by the first user. Examples of crypto tokens that may be transferred without incurring transfer fees may include crypto tokens that are managed by a smart contract that charges transfer fees to another party.

The wallet application 210, based on receiving the one or more inputs from the first user of the user device 240-*a*, may broadcast a message configured to transfer the one or more crypto tokens to the blockchain address 225-*b* via the blockchain network 205. In some examples, the blockchain network 205 may be associated with the selected crypto token. For example, the user may send an amount of a first crypto token (e.g., Eth) via a blockchain network associated with the first crypto token (e.g., an Ethereum network). In some cases, the broadcast message may be configured to transfer the one or more crypto tokens without deducting a fee from the blockchain address 225-*a*, the blockchain address 225-*b*, or both. For example, a crypto token may be transferred without a fee based on the crypto token being gasless (e.g., the fee is handled by another party based on a smart contract associated with the transferred token).

The messaging service 220 may display, via the first user interface of the user device 240-*a*, a second user interface of the user device 240-*b*, or both, an indication of the broadcasted message. In some examples, the indication may include a status of the message. For example, the status may indicate whether the broadcasted message is pending, complete, or failed on the blockchain network 205.

In some examples, the first user may transmit another message to the blockchain address 225-*b* of the second user via the messaging network 215. For example, the message may include information associated with the broadcasted message on the blockchain network 205. That is, the first user may transmit the message including information about the broadcasted message such that the messaging service 220 may update the first user interface, the second user interface, or both with information associated with the broadcast message. For example, the information may include the status of the broadcast message.

Accordingly, the wallet application 210, in addition to supporting blockchain related operations (e.g., send, receive, transfer), supports a messaging service that leverages the blockchain addresses. Additionally, the messaging service allows a user to initiate crypto token transfer via the user interface of the messaging services. Thus, the wallet application is configured transfer tokens via multiple blockchain networks and to transfer messages using a decentralized messaging protocol using the corresponding blockchain addresses. The messaging service of the wallet application may support transfer of different types of crypto tokens including layer 1 tokens, layer 2 tokens, tokens issued or supported by smart contract, NFTs, and the like. Thus, the user may select and send different types of tokens associated with the blockchain addresses.

Figure 3:
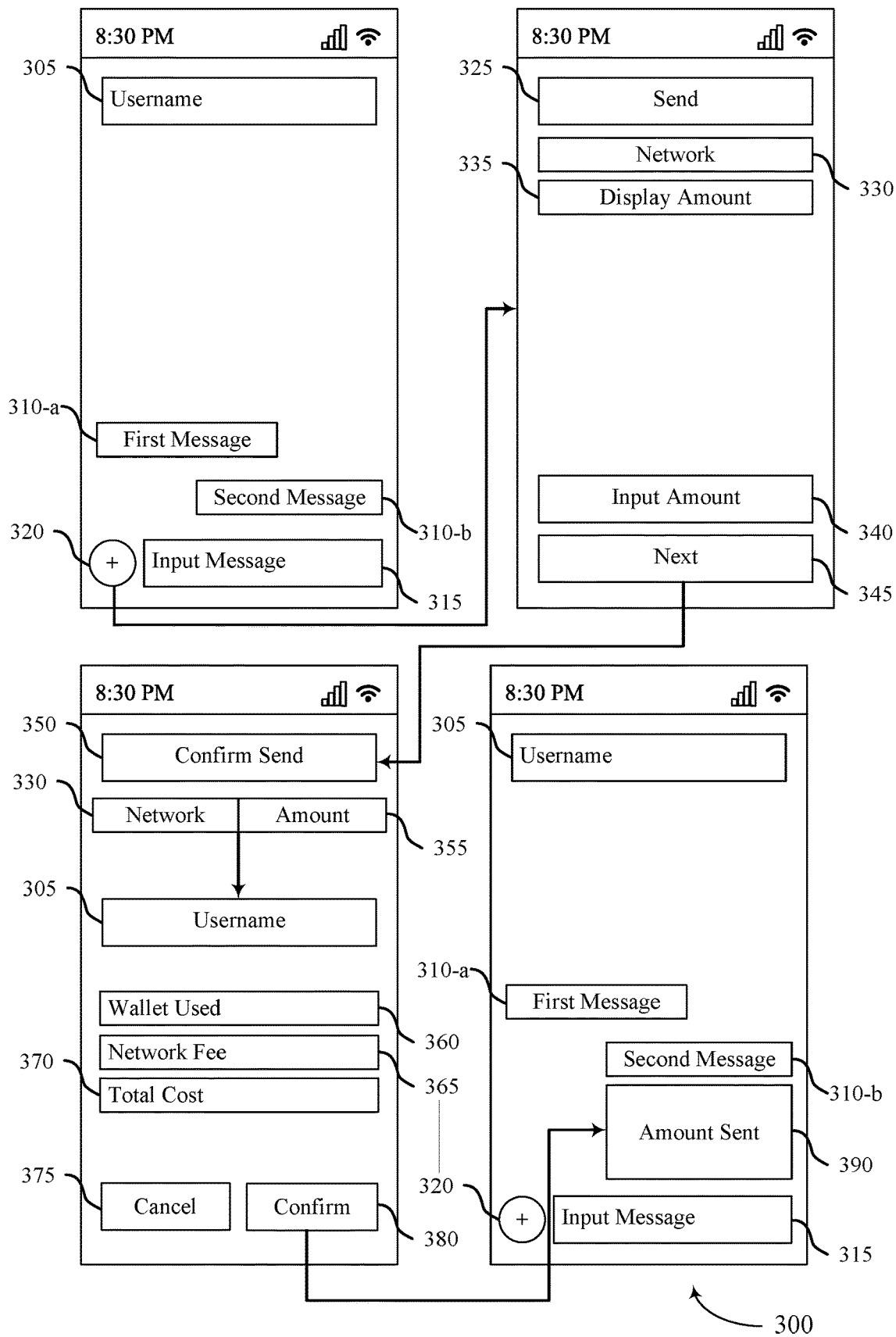
FIG. 3 shows an example of a user interface diagram that supports token transfer via messaging service of wallet application in accordance with aspects of the present disclosure.

FIG. 3 shows an example of a user interface diagram 300 that supports token transfer via messaging service of wallet application in accordance with aspects of the present disclosure. The user interface diagram 300 may be implemented by a wallet application on a user device, which may be examples of corresponding devices or systems as described with respect to FIGS. 1 and 2.

A user interface of the user interface diagram 300 may display one or more indications, one or more options, or a combination thereof and receive one or more inputs to support token transfer via messaging service of wallet application as described herein. The user interface diagram 300 includes an example of a user interface flow wherein a user may send or receive one or more messages, an amount of a crypto token, or both.

The user (i.e., a first user) may enter the user interface flow in the user interface diagram 300 by selecting, of one or more users available to message, a different user (i.e., a second user) associated with a username 305. The username 305 may be associated with a blockchain address of the second user.

In some examples, and as shown in the example of FIG. 3, the second user may send a first message 310-a to the first user. Additionally, or alternatively, the first user may send a second message 310-b to the second user. The first message 310-a, the second message 310-b, or both may be sent or received via a decentralized messaging protocol (e.g., XMTP) and using the corresponding blockchain addresses.

The first user may input a message 315 (e.g., type and select an option to send a message), send an amount of a crypto token 320, or both via the user interface of the messaging service. For example, the user may select to input a message 315. The user interface, based on the selection, may display a digital key board for inputting characters of a message.

The first user may select to send an amount of a crypto token 320. Based on the selection, the user interface may display one or more indications, including a send indication 325 (e.g., indicating that one or more options displayed on the user interface are to be sent) and an indication of a display amount 335 (e.g., indicating an amount input by the user), and one or more options, including an option to select a token associated with a network 330 via which an amount of crypto tokens may be sent, an option to input an amount 340, and a next option 345 (e.g., to proceed with sending the display amount 335 via the selected network 330 to the second user). The first user may select a token via which the input amount 340 may be sent. The selected token (e.g., Eth) may be associated with the network 330 k (e.g., Ethereum), and the input amount 340) corresponds to the crypto token associated with the blockchain network.

The wallet application may determine one or more suggested networks (e.g., tokens), amounts, or both to be autofilled in the user interface. For example, the wallet application may autofill the network 330 with a network associated with a highest amount of tokens (e.g., relative to other networks on which the user account has an amount of tokens) for a user account of the first user, a network most frequently used by the first user, a network associated with a low network fee (e.g., relative to other networks), a network associated with a value (e.g., a best value relative to other networks) or the like. Additionally, or alternatively, the wallet application may autofill the indication of the display amount 335 according to an amount of tokens commonly sent by one or more other users (e.g., on a same network as the network 330 or on a different network), an amount of tokens commonly sent by the first user, or the like. That is, the wallet application may suggest one or more parameters, such as the network 330, the amount of tokens, or both for the first user.

In some examples, the first user may select the one or more parameters. For example, the first user may select the network 330, where the selected network 330 may be the same or different than the suggested network displayed via the user interface. Additionally, or alternatively, the first user may input the amount 340, where the amount may be the same or different than the suggested amount displayed via the user interface.

The input amount 340 may be one of a percentage of a crypto token (e.g., a percentage of the total amount of the crypto token associated with the user account of the first user) associated with the selected network 330, a dollar amount, an amount of the crypto token, or the like. The first user may elect to input a threshold amount of the crypto token (e.g., a maximum amount of the crypto token available associated with the user account of the first user). Further, while not explicitly shown in FIG. 3, the user interface may display an amount of the crypto token available such that the first user may select the input amount 340 based on the amount of the crypto token available, select an input amount 340 that does not exceed the amount available, or both.

The user may select the next option 345 to proceed with sending the amount of crypto tokens. For example, the user may select the next option 345 after selecting the network 330, the input amount 340, or both, or, otherwise, opting to send the autofilled amount via the autofilled network determined by the wallet application.

Based on the selection of the next option 345, the user interface may display one or more indications, including a confirm send indication 350 (e.g., indicating that one or more options displayed on the user interface are to be confirmed by the first user to be sent), an indication of the network 330 (e.g., the selected network), an indication of an amount 355 (e.g., indicating the input amount 340 selected by the user), an indication of the username 305 of the second user to which the first user is sending the amount 355, an indication of a wallet used 360, an indication of the network fee 365, and an indication of the total cost 370. That is, the user interface may display a summary of the amount to be sent to the second user.

In some examples, the indication of the wallet used 360 may indicate a blockchain address of a quantity of blockchain addresses associated with the wallet application of the user. For example, the indication of the wallet used 360 may indicate to the user which blockchain address the amount of crypto tokens are to be sent from.

In some examples, the network fee 365 may be based on the network 330. That is, different networks may be associated with different network fees such that the network fee 365 indicated by the user interface corresponds to the selected network 330. For example, the selected network 330 may be associated with a crypto token (e.g., USDC) wherein the network fee 365 is foregone. For example, a transaction associated with the crypto token may be gasless such that the wallet application indicates to the network 330 (e.g., when broadcasting the transaction) that no network fee 365 may be deducted from the blockchain address of the user.

Additionally, or alternatively, the user interface may display one or more options, including a cancel option 375 and a confirm option 380. The first user may select to cancel sending the amount via the cancel option 375 or confirm sending the amount via the confirm option 380. Further, the first user may select to return to the previous user interface of the user interface flow to change (e.g., edit or reselect) the network 330, the input amount 340, or both.

In some examples, user may select the confirm option 380, and the user interface may display the exchange of the first message 310-a and the second message 310-b (e.g., as initially displayed) with the addition of an amount sent 390.

The amount sent 390 may reflect the input amount 340 and the indication of the amount 355.

In some examples, the user interface may display the amount sent 390 as pending. For example, the user interface may indicate that the amount sent 390 has not yet been received by the second user. That is, the user interface may display the amount sent 390 as pending until the amount sent 390 is processed via the network 330. Or, the user interface may display the amount sent 390 as sent. For example, the user interface may indicate that the amount sent 390 is received by the second user.

In such cases, a status of the amount sent 390 (e.g., as pending or sent) may be determined according to the network 330 (e.g., a blockchain network via which the amount is sent). That is, the wallet application may communicate with the network 330 such that the status of the amount sent 390 is displayed via the user interface.

The described user interface flow may support a wallet application that allows a user to leverage a messaging service to send and receive both messages and digital assets, such as crypto tokens, via a user interface of the wallet application. A first user interface may receive, from a first user, one or more inputs to initiate a process for sending a crypto token to a second blockchain address of a second user. The wallet application may broadcast a message via a blockchain network associated with the crypto token, where the message is configured to transfer the crypto token from the first blockchain address to the second blockchain address. The first user interface, a second user interface associated with the second user, or both may be updated to indicate the progress of the transfer. As such, the users of the wallet application may transfer crypto tokens from a blockchain address via a blockchain network while, in a same user interface, sending and receiving messages via a messaging service.

Figure 4:
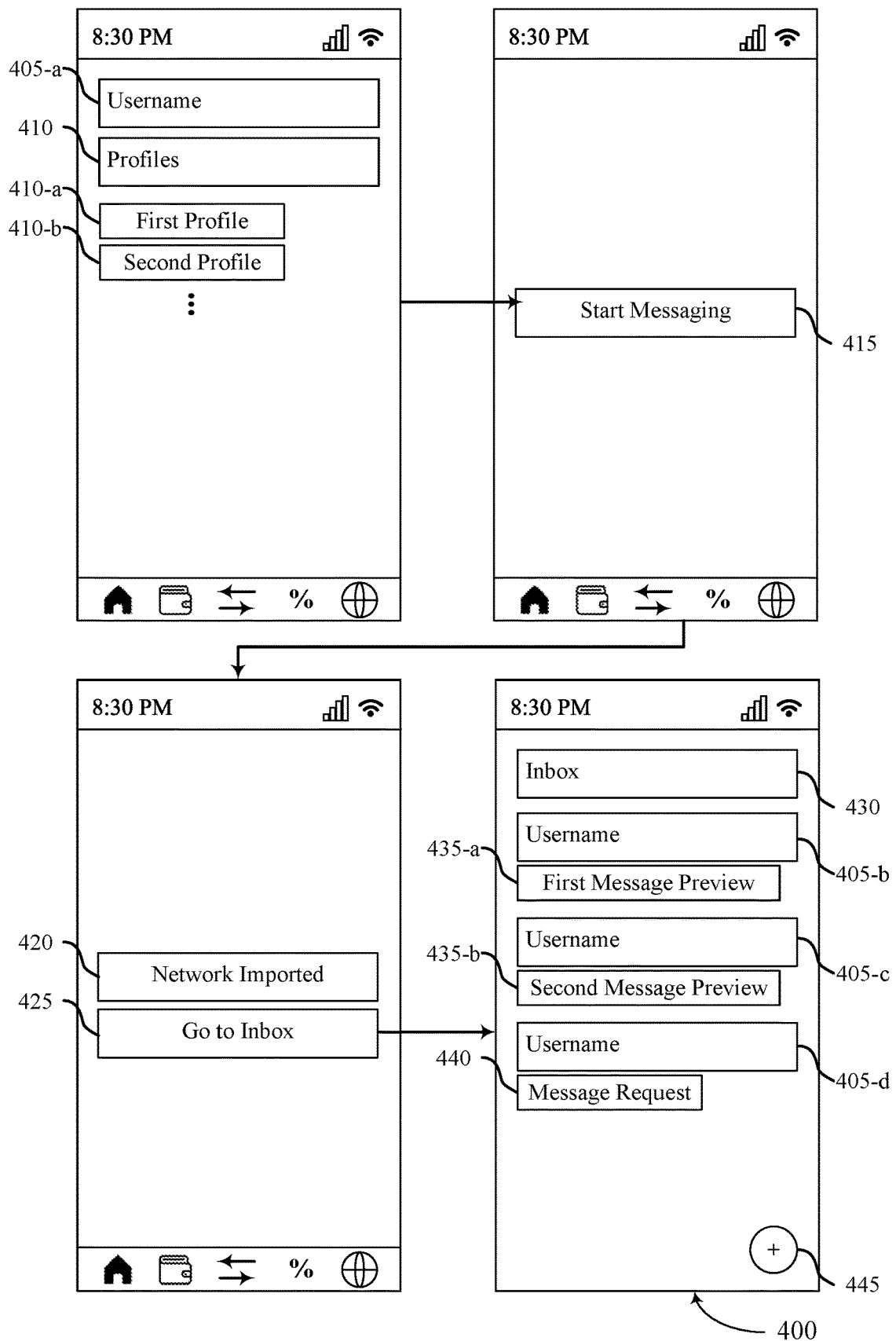
FIG. 4 shows an example of a user interface diagram that supports token transfer via messaging service of wallet application in accordance with aspects of the present disclosure.

FIG. 4 shows an example of a user interface diagram 400 that supports token transfer via messaging service of wallet application in accordance with aspects of the present disclosure. The user interface diagram 400 be implemented by a wallet application via a user device, which may be examples of corresponding devices or systems as described with respect to FIGS. 1 and 2.

A user interface of the user interface diagram 400 may display one or more indications, one or more options, or a combination thereof and receive one or more inputs to support token transfer and messaging via messaging service of wallet application as described herein. The user interface diagram 400 includes an example of a user interface flow wherein a user may begin sending or receiving one or more messages, an amount of a crypto token, or both.

The user interface may display an indication of a username 405-*a* associated with the user and a list of profiles 410 (e.g., including a first profile 410-*a*, a second profile 410-*b*, and so on). In some cases, the first profile 410-*a*, the second profile 410-*b*, or both may be a profile type associated with a network (e.g., a Lens network).

A wallet application may determine that a profile of the list of profiles 410 associated with a user account of the user satisfies a criteria. For example, the criteria may be that a profile is associated with a network (e.g., a Lens network). In such cases, the custodial token platform, based on at least one profile of the list of profiles satisfying the criteria, display a start messaging option 415 via the user interface.

The start messaging option 415 may include an indication that messaging is supported by a decentralized messaging protocol (e.g., XMTP). The user may select the start messaging option 415 or, otherwise, exit the user interface flow.

The user interface may, based on the user selecting the start messaging option 415, display an indication that an existing network associated with the username 405-*a* is imported to the inbox of the wallet application. For example, the user interface may display an indication that a network is imported 420 to the inbox of the wallet application.

Further, the user interface may display an option to go to the inbox 425. For example, the user may select the option to go to the inbox 425, and, accordingly, the user interface may display an inbox 430 including a list of usernames and message previews.

The list of usernames and message previews in the inbox may be based on the network being imported to the inbox 430. That is, a username 405-*b* and a first message preview 435-*a*, a username 405-*c* and a second message preview 435-*b*, or both may be imported to the inbox 430 from the network. In some examples, the user interface may display the message previews such that, to display the entire message, the user may select a username, a message preview; or both. Additionally, or alternatively, the inbox 430 may include one or more message requests. For example, the inbox 430 may include a message request 440 from a user associated with a username 405-*d*. The user may select to accept, deny, or ignore the message request 440 from the user associated with the username 405-*d*. In some examples, the message request 440) may be imported to the inbox 430 from the network or may be a new message associated with the messaging network.

The user may generate one or more messages via a create message option 445. For example, the user may draft, send, or both the one or more messages via the create message option. The user may select from one or more users associated with the imported network to send the one or more messages. For example, the user interface may indicate one or more users available to send messages to, where the one or more users are available based on being imported by the network.

Additionally, or alternatively, the one or more users may be suggested to the user based on metadata associated with the wallet application. For example, the one or more users may be suggested (e.g., by the wallet application, via the user interface) based on a decentralized social graph (e.g., lens.xyz), one or more proof of attendance protocol (POAP) non-fungible tokens, or both. For example, the wallet application may identify one or more other user accounts associated with one or more POAP non-fungible tokens which overlap with one or more POAP non-fungible tokens associated with the user account. For example, if a first blockchain address of a first user is associated with a POAP token, and a second blockchain address of a second user is associated with a corresponding (e.g., same) POAP token, then the wallet application may suggest that these users message one another. PAOP tokens (or other attendance based tokens) may be attainable by users based attendance to in person or virtual events. In such events, attendees may be provided with techniques (e.g., passwords or codes) for redeeming/minting the tokens.

In some examples, the user may exchange one or more messages, send crypto tokens, or both with the one or more suggested users. For example, the user may transfer crypto tokens from a blockchain address via a blockchain network while, in a same user interface, sending and receiving messages via a messaging service.

Figure 5:
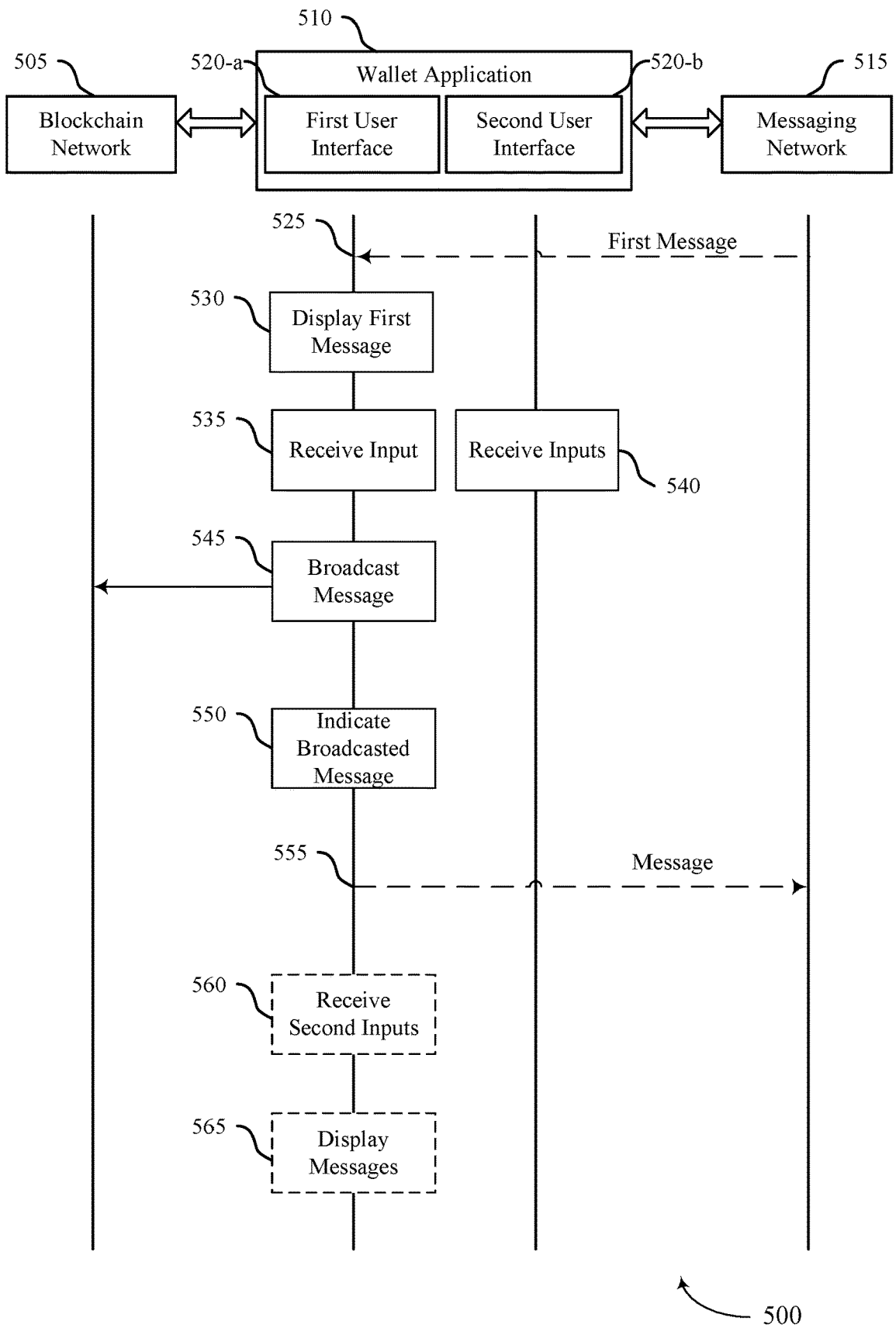
FIG. 5 shows an example of a process flow that supports token transfer via messaging service of wallet application in accordance with aspects of the present disclosure.

FIG. 5 shows an example of a process flow 500 that supports token transfer via messaging service of wallet application in accordance with aspects of the present disclosure.

The process flow: 500 may include a blockchain network 505, a wallet application 510, and a messaging network 515. The wallet application 510 may include a first user interface 520-*a* and a second user interface 520-*b*. The wallet application 510 and the messaging network 515 may be an example of the wallet applications and messaging networks, respectively, as described with respect to FIG. 2. The blockchain network 505 may be an example of the blockchain networks as described with respect to FIGS. 1 and 2. The first user interface 520-*a* and the second user interface 520 may implement the user interface diagram 300, the user interface diagram 400, or both, as described with respect to FIGS. 3 and 4.

In the following description of the process flow 500, the operations between the blockchain network 505, the first user interface 520-*a*, the second user interface 520-*b*, and the messaging network 515 may be transmitted in a different order than the example order shown, or the operations performed may be performed in different orders or at different times. Some operations may also be omitted from the process flow 500, and other operations may be added to the process flow 500.

In some examples, a user may exchange one or more messages, send crypto tokens, or both with the one or more other users. For example, the user may initiate transfer crypto tokens from a blockchain address via the blockchain network 505 while, in a same user interface, sending and receiving messages via a messaging service using the messaging network 515.

At 525, the messaging network 515 may deliver a first message (e.g., transmitted by a second blockchain address) to the wallet application 510. In some examples, the wallet application may detect transfer of the first message to an address (e.g., a blockchain address) associated with the wallet application 510 via the decentralized messaging protocol (e.g., the messaging network 515).

At 530, the wallet application 510 may cause the first user interface 520-*a* to display the first message from a second user. In some examples, the wallet application 510 may be configured with at least one first blockchain address for the first user. For example, the first user may be associated with one or more blockchain addresses, of which the wallet application 510 may be configured with at least one.

The wallet application 510 may include a messaging service on which the first user interface 520-*a*, the second user interface 520-*b*, or both display one or more messages, one or more transactions, or both. For example, the messaging service may support a decentralized messaging protocol (e.g., an extensible message transport protocol (XMTP) for exchanging messages between the first user (e.g., associated with the first user interface) and a second user (e.g., associated with the second user interface).

At 535, the first user interface 520-*a* may receive an input. For example, the input may be to initiate a process for sending a crypto token to a second blockchain address of the second user. In some examples, the first user interface 520-*a* may (e.g., simultaneously) receive the input and display the first message.

At 540, the second user interface 520-*b* may receive one or more inputs. For example, the wallet application 510 may receive the one or more inputs via the second user interface 520-*b* of the second user. The one or more inputs may include inputs to select a token (or network), an amount, etc. The wallet application 510 may determine that the selected or input crypto token is a crypto token type that is transferrable without incurring transfer fees by a sender. For example, the crypto token may be a crypto token type that is gasless such that no network fee is incurred by the first user or the second user.

At 545, the wallet application 510 may broadcast a second message vi the blockchain network 505. For example, the second message may be configured to transfer the crypto token to the second blockchain address of the second user. In some examples, the second message may be configured to transfer the crypto token from the first blockchain address to the second blockchain address. That is, the crypto token may be transferred between blockchain addresses associated with users. In some examples, the second message may be configured to transfer the crypto token without deducting a fee from the first blockchain address associated with the first user. For example, the crypto token may be a crypto token type that is gasless such that no fee is deducted.

At 550, the wallet application 510 may update the first user interface 520-*a* to indicate the broadcasted message. For example, the first user interface 520-*a* may include a visual indication of the broadcasted message (e.g., the second message) via the blockchain network 505.

In some examples, the visual indication of the broadcasted message may include an indication of a status of the second message. For example, the status may indicate whether the second message is pending or complete on the blockchain network 505.

At 555, the wallet application 510 may transmit, via the messaging network 515 (e.g., the decentralized messaging protocol), a message to the second blockchain address. The third message may include information associated with the message that is broadcast via the blockchain network. For example, the message transferred via the message network may include information such as transaction identifier, amount, token type, and other contextual information. This information may be used to display information associated with the transaction via the wallet application on the other user device.

At 560, the first user interface 520-*a* may receive second inputs. For example, the first user interface 520-*a* may receive one or more second inputs indicating a blockchain address (e.g., different than the first blockchain address) associated with the first user. That is, the first user may import a new wallet address. In some cases, the blockchain address may be input via a seed phrase. That is, the second inputs may include a seed phrase associated with the blockchain address. For example, the first user may be associated with one or more blockchain addresses, where a subset of the blockchain addresses is associated with the wallet application 510 and the messaging service.

In some cases, the blockchain address may be associated with one or more messages different from one or more messages associated with the first blockchain address.

At 565, the first user interface 520-*a* may display messages. That is, the first user interface 520-*a* may display messages associated with a blockchain address (e.g., a specific blockchain address). For example, one or more messages associated with the blockchain address may be exchanged with the second blockchain address, but may be displayed in a message thread different from one or more messages associated with the first blockchain address exchanged with the second blockchain address. That is, the wallet application 510 may display one or more third messages associated with the blockchain address (e.g., the input blockchain address) via the decentralized messaging protocol.

In some examples, the first user interface 520-*a*, the second user interface 520-*b*, or both may include a user interface element that, when selected, causes the first user interface 520-*a*, the second user interface 520-*b*, or both to display a digital keyboard. For example, the first user and the second user may input characters for a message via the digital keyboard displayed on the respective user interfaces.

In some cases, the wallet application 510 may suggest one or more users to message. For example, the wallet application 510 may display, via the first user interface 520-*a* one or more suggested users based on metadata associated with the wallet application 510. In some examples, the metadata may include one or more proof of attendance protocol (POAP) non-fungible tokens associated with the first blockchain address. For example, the suggested users may be associated with one or more same POAP non-fungible tokens as the first blockchain address (e.g., overlapping POAP non-fungible tokens). Additionally, or alternatively, the metadata may include a decentralized social graph.

In some cases, the wallet application 210, via the decentralized messaging protocol, may transmit a third message to the second blockchain address. For example, the first user interface 520-*a* and the second user interface 520-*b* may display the third message as being sent from the first user to the second user. The third message may be sent via the messaging network 515. In some examples, the third message may include information associated with the second message broadcast via the blockchain network 505.

Figure 6:
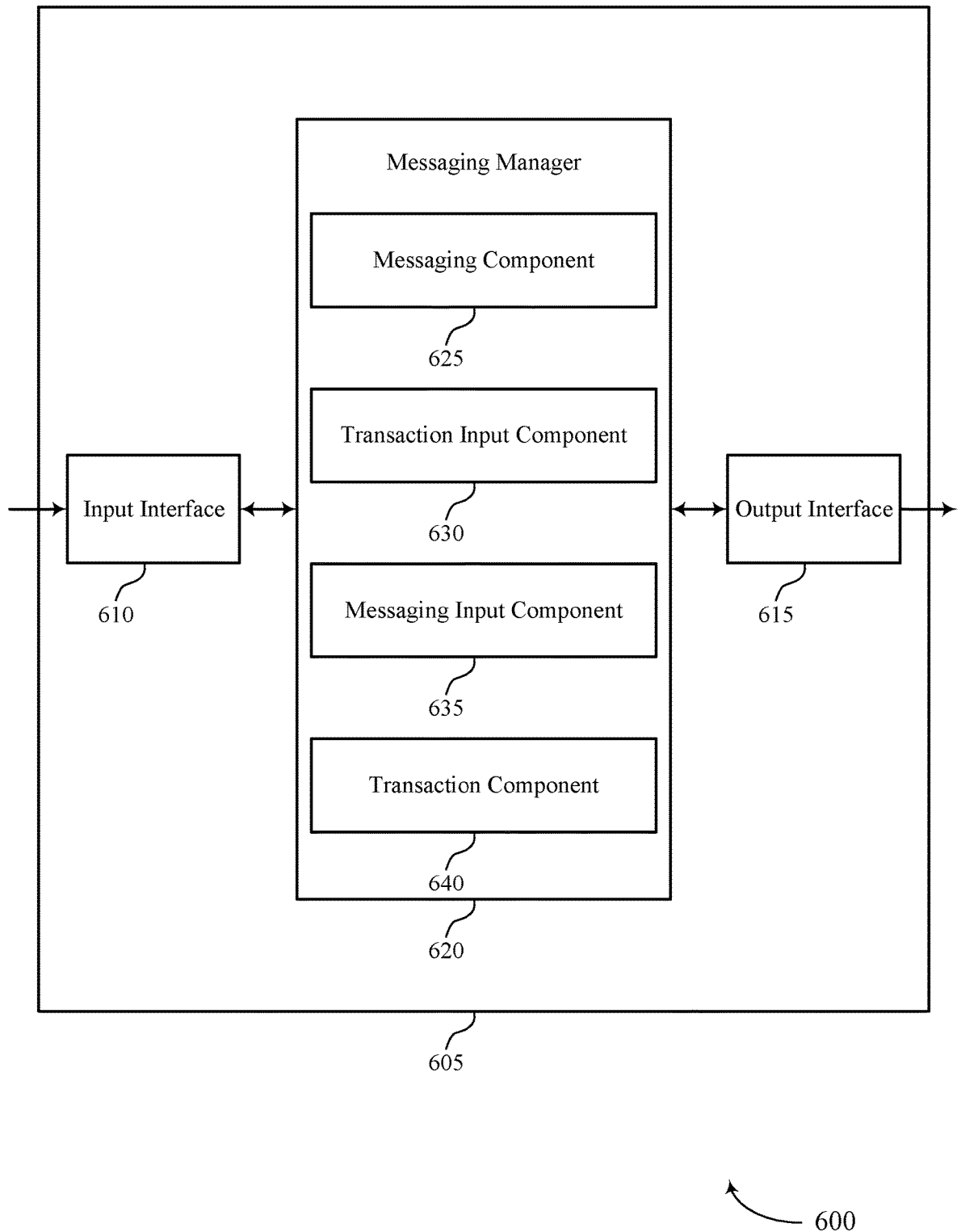
FIG. 6 shows a block diagram of an apparatus that supports token transfer via messaging service of wallet application in accordance with aspects of the present disclosure.

FIG. 6 shows a block diagram 600 of a system 605 that supports token transfer via messaging service of wallet application in accordance with aspects of the present disclosure. The system 605 may include an input interface 610, an output interface 615, and a messaging manager 620. The system 605, or one or more components of the system 605 (e.g., the input interface 610, the output interface 615, and the messaging manager 620), may include at least one processor, which may be coupled with at least one memory, to support the described techniques. Each of these components may be in communication with one another (e.g., via one or more buses).

The input interface 610 may manage input signaling for the system 605. For example, the input interface 610 may receive input signaling (e.g., messages, packets, data, instructions, commands, transactions, or any other form of encoded information) from other systems or devices. The input interface 610 may send signaling corresponding to (e.g., representative of or otherwise based on) such input signaling to other components of the system 605 for processing. For example, the input interface 610 may transmit such corresponding signaling to the messaging manager 620 to support token transfer via messaging service of wallet application. In some cases, the input interface 610 may be a component of a network interface 825 as described with reference to FIG. 8.

The output interface 615 may manage output signaling for the system 605. For example, the output interface 615 may receive signaling from other components of the system 605, such as the messaging manager 620, and may transmit such output signaling corresponding to (e.g., representative of or otherwise based on) such signaling to other systems or devices. In some cases, the output interface 615 may be a component of a network interface 825 as described with reference to FIG. 8.

For example, the messaging manager 620 may include a messaging component 625, a transaction input component 630, a messaging input component 635, a transaction component 640, or any combination thereof. In some examples, the messaging manager 620, or various components thereof, may be configured to perform various operations (e.g., receiving, monitoring, transmitting) using or otherwise in cooperation with the input interface 610, the output interface 615, or both. For example, the messaging manager 620 may receive information from the input interface 610, send information to the output interface 615, or be integrated in combination with the input interface 610, the output interface 615, or both to receive information, transmit information, or perform various other operations as described herein.

The messaging manager 620 may support crypto token management in accordance with examples as disclosed herein. The messaging component 625 may be configured as or otherwise support a means for causing, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user. The transaction input component 630 may be configured as or otherwise support a means for receiving, via the first user interface displaying the first message within the messaging service, an input to initiate a process for sending a crypto token to a second blockchain address of the second user. The messaging input component 635 may be configured as or otherwise support a means for receiving one or more inputs at a second user interface of the wallet application. The transaction component 640 may be configured as or otherwise support a means for broadcasting, via a blockchain network and based at least in part on the one or more inputs, a second message that is configured to transfer the crypto token to the second blockchain address of the second user. The messaging component 625 may be configured as or otherwise support a means for updating the first user interface to include a visual indication of the broadcasted second message via the blockchain network.

Figure 7:
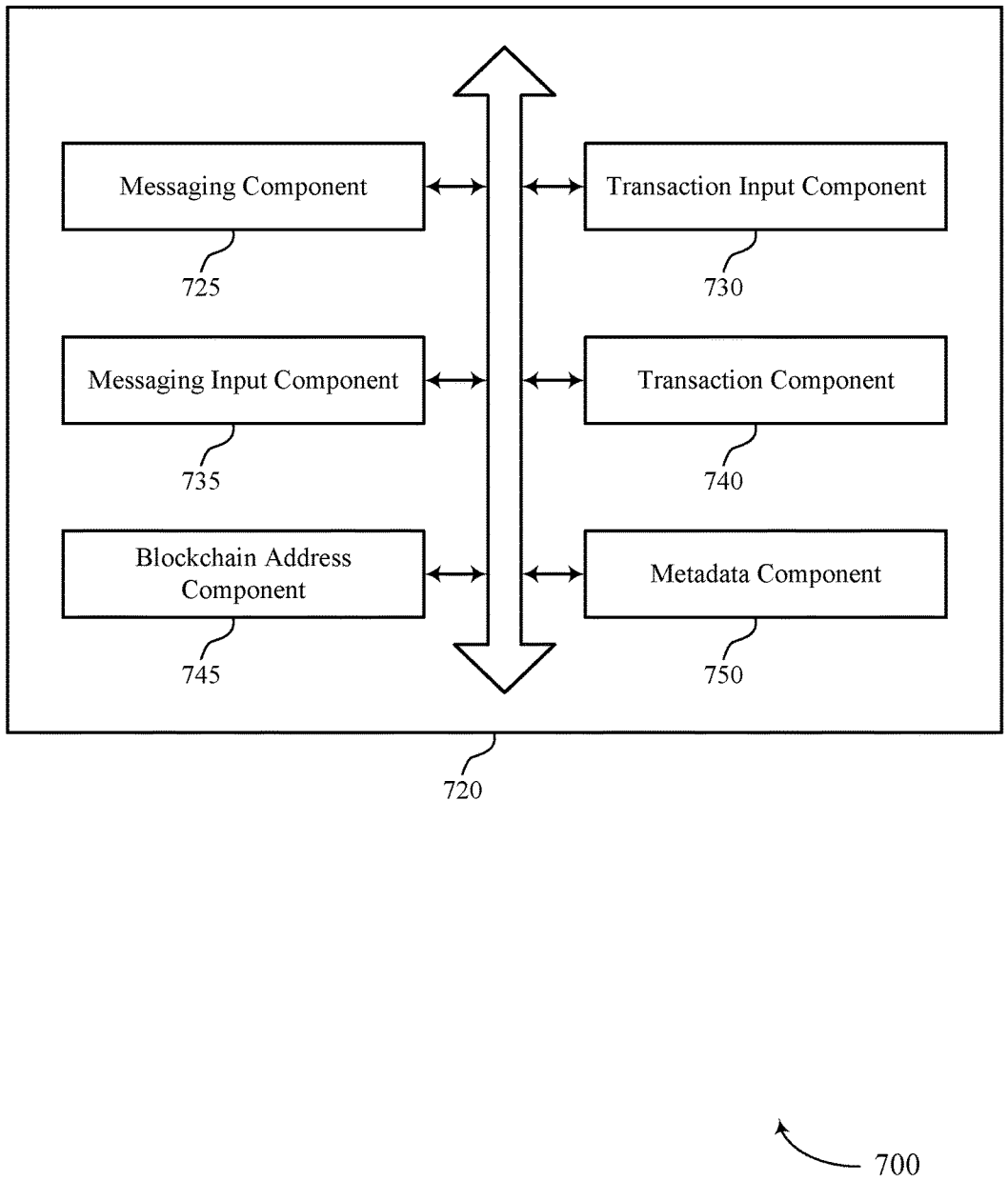
FIG. 7 shows a block diagram of a messaging manager that supports token transfer via messaging service of wallet application in accordance with aspects of the present disclosure.

FIG. 7 shows a block diagram 700 of a messaging manager 720 that supports token transfer via messaging service of wallet application in accordance with aspects of the present disclosure. The messaging manager 720 may be an example of aspects of a messaging manager or a messaging manager 620, or both, as described herein. The messaging manager 720, or various components thereof, may be an example of means for performing various aspects of token transfer via messaging service of wallet application as described herein. For example, the messaging manager 720) may include a messaging component 725, a transaction input component 730, a messaging input component 735, a transaction component 740, a blockchain address component 745, a metadata component 750), or any combination thereof. Each of these components may communicate, directly or indirectly, with one another (e.g., via one or more buses, communications links, communications interfaces, or any combination thereof).

The messaging manager 720 may support crypto token management in accordance with examples as disclosed herein. The messaging component 725 may be configured as or otherwise support a means for causing, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user. The transaction input component 730 may be configured as or otherwise support a means for receiving, via the first user interface displaying the first message within the messaging service, an input to initiate a process for sending a crypto token to a second blockchain address of the second user. The messaging input component 735 may be configured as or otherwise support a means for receiving one or more inputs at a second user interface of the wallet application. The transaction component 740) may be configured as or otherwise support a means for broadcasting, via a blockchain network and based at least in part on the one or more inputs, a second message that is configured to transfer the crypto token to the second blockchain address of the second user. In some examples, the messaging component 725 may be configured as or otherwise support a means for updating the first user interface to include a visual indication of the broadcasted second message via the blockchain network.

In some examples, the second message is configured to transfer the crypto token from a first blockchain address of the at least one first blockchain address.

In some examples, the messaging component 725 may be configured as or otherwise support a means for detecting transfer of the first message to a wallet address associated with the wallet application via the decentralized messaging protocol, wherein the first message is displayed based at least in part on detecting transfer of the first message.

In some examples, the decentralized messaging protocol is Extensible Message Transport Protocol (XMTP).

In some examples, the visual indication of the broadcasted second message includes an indication of a status of the second message. In some examples, the status indicates whether the second message is pending or complete on the blockchain network.

In some examples, the blockchain address component 745 may be configured as or otherwise support a means for receiving, via the wallet application, one or more second inputs that are indicative of a third blockchain address associated with the first user. In some examples, the messaging component 725 may be configured as or otherwise support a means for causing, at the first user interface, display of one or more third messages associated with the third blockchain address via the decentralized messaging protocol.

In some examples, the one or more second inputs comprise a seed phrase associated with the second blockchain address.

In some examples, the first user interface includes a user interface element that, when selected, causes display of a digital keyboard for inputting characters for a message.

In some examples, the metadata component 750 may be configured as or otherwise support a means for suggesting one or more users to message based at least in part on metadata associated with the wallet application.

In some examples, the metadata comprises one or more proof of attendance protocol (POAP) non-fungible tokens associated with the first blockchain address of the wallet application, a decentralized social graph, or a combination thereof.

In some examples, the transaction component 740 may be configured as or otherwise support a means for determining that the crypto token is a crypto token type that is transferrable without incurring transfer fees by a sender, wherein the second message is configured to transfer the crypto token without deducting a fee from the first blockchain address associated with the first user based at least in part on the crypto token being the crypto token type.

In some examples, the messaging component 725 may be configured as or otherwise support a means for transmitting, via the decentralized messaging protocol, a third message to the second blockchain address, the third message including information associated with the second message broadcast via the blockchain network.

Figure 8:
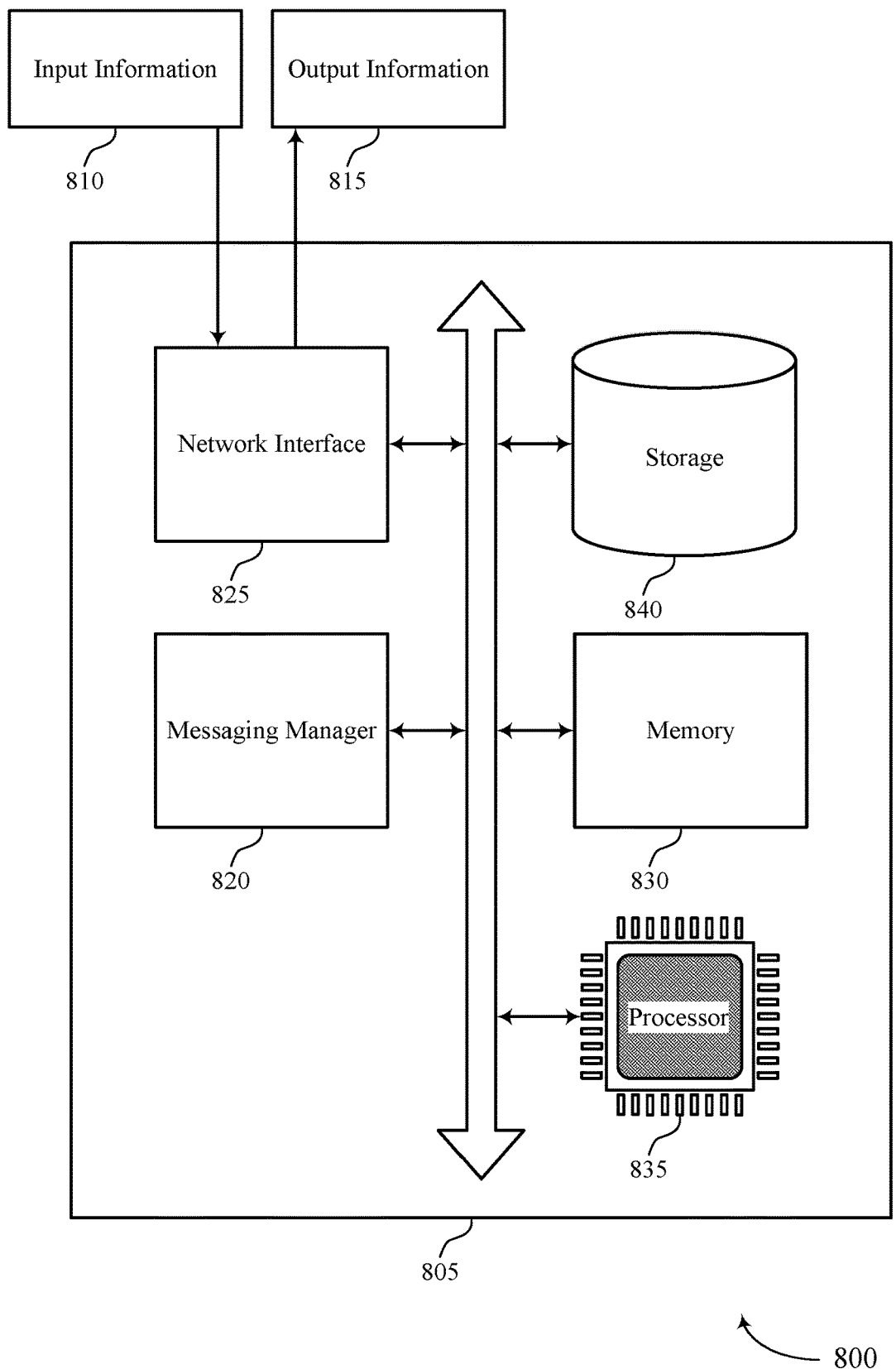
FIG. 8 shows a diagram of a system including a device that supports token transfer via messaging service of wallet application in accordance with aspects of the present disclosure.

FIG. 8 shows a diagram of a system 800 including a system 805 that supports token transfer via messaging service of wallet application in accordance with aspects of the present disclosure. The system 805 may be an example of or include the components of a system 605 as described herein. The system 805 may include components for bi-directional voice and data communications including components for transmitting and receiving communications, such as a messaging manager 820, an input information 810, an output information 815, a network interface 825, at least one memory 830, at least one processor 835, and a storage 840. Each of these components may communicate, directly or indirectly, with one another (e.g., via one or more buses, communications links, communications interfaces, or any combination thereof).

The network interface 825 may enable the system 805 to exchange information (e.g., input information 810, output information 815, or both) with other systems or devices (not shown). For example, the network interface 825 may enable the system 805 to connect to a network (e.g., a network 135 as described herein). The network interface 825 may include one or more wireless network interfaces, one or more wired network interfaces, or any combination thereof.

Memory 830 may include RAM, ROM, or both. The memory 830 may store computer-readable, computer-executable software including instructions that, when executed, cause at least one processor 835 to perform various functions described herein, such as functions supporting token transfer via messaging service of wallet application. In some cases, the memory 830 may contain, among other things, a basic input/output system (BIOS), which may control basic hardware or software operation such as the interaction with peripheral components or devices. In some cases, the memory 830 may be an example of aspects of one or more components of a custodial token platform 110 as described with reference to FIG. 1. The memory 830 may be an example of a single memory or multiple memories. For example, the system 805 may include one or more memories 830.

The processor 835 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 835 may be configured to execute computer-readable instructions stored in at least one memory 830 to perform various functions (e.g., functions or tasks supporting token transfer via messaging service of wallet application). Though a single processor 835 is depicted in the example of FIG. 8, it is to be understood that the system 805 may include any quantity of one or more of processors 835 and that a group of processors 835 may collectively perform one or more functions ascribed herein to a processor, such as the processor 835. The processor 835 may be an example of a single processor or multiple processors. For example, the system 805 may include one or more processors 835.

Storage 840) may be configured to store data that is generated, processed, stored, or otherwise used by the system 805. In some cases, the storage 840 may include one or more HDDs, one or more SDDs, or both. In some examples, the storage 840 may be an example of a single database, a distributed database, multiple distributed databases, a data store, a data lake, or an emergency backup database.

The messaging manager 820 may support crypto token management in accordance with examples as disclosed herein. For example, the messaging manager 820 may be configured as or otherwise support a means for causing, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user. The messaging manager 820) may be configured as or otherwise support a means for receiving, via the first user interface displaying the first message within the messaging service, an input to initiate a process for sending a crypto token to a second blockchain address of the second user. The messaging manager 820 may be configured as or otherwise support a means for receiving one or more inputs at a second user interface of the wallet application. The messaging manager 820 may be configured as or otherwise support a means for broadcasting, via a blockchain network and based at least in part on the one or more inputs, a second message that is configured to transfer the crypto token to the second blockchain address of the second user. The messaging manager 820 may be configured as or otherwise support a means for updating the first user interface to include a visual indication of the broadcasted second message via the blockchain network.

By including or configuring the messaging manager 820 in accordance with examples as described herein, the system 805 may support techniques for improved communication reliability, more efficient utilization of communication resources, and improved coordination between devices.

Figure 9:
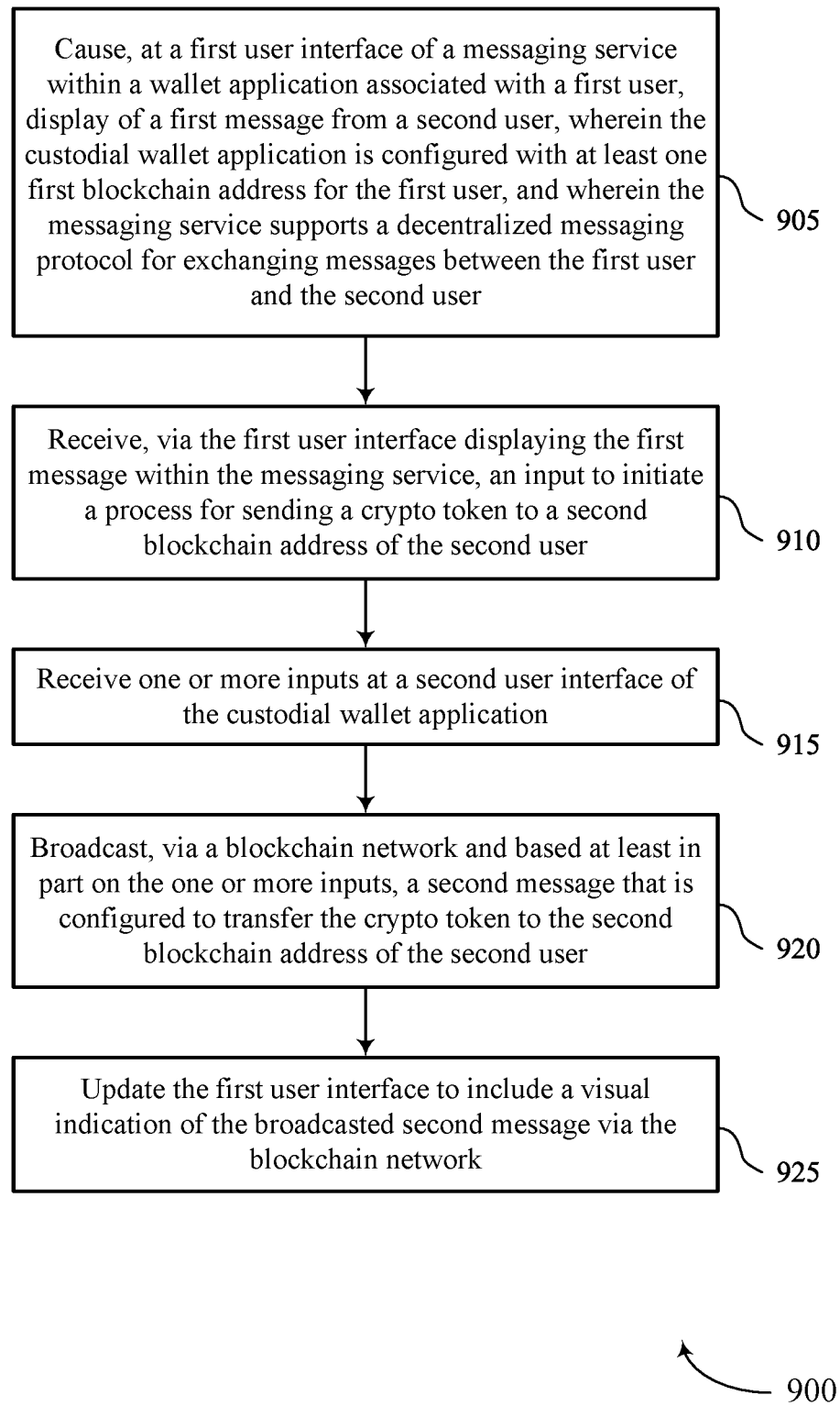
FIGS. 9 and 10 show flowcharts illustrating methods that support token transfer via messaging service of wallet application in accordance with aspects of the present disclosure.

FIG. 9 shows a flowchart illustrating a method 900 that supports token transfer via messaging service of wallet application in accordance with aspects of the present disclosure. The operations of the method 900 may be implemented by a wallet application or its components as described herein. For example, the operations of the method 900 may be performed by a wallet application as described with reference to FIGS. 1 through 8. In some examples, a wallet application may execute a set of instructions to control the functional elements of the wallet application to perform the described functions. Additionally, or alternatively, the wallet application may perform aspects of the described functions using special-purpose hardware.

At 905, the method may include causing, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user. The operations of block 905 may be performed in accordance with examples as disclosed herein. In some examples, aspects of the operations of 905 may be performed by a messaging component 725 as described with reference to FIG. 7.

At 910, the method may include receiving, via the first user interface displaying the first message within the messaging service, an input to initiate a process for sending a crypto token to a second blockchain address of the second user. The operations of block 910 may be performed in accordance with examples as disclosed herein. In some examples, aspects of the operations of 910 may be performed by a transaction input component 730 as described with reference to FIG. 7.

At 915, the method may include receiving one or more inputs at a second user interface of the wallet application. The operations of block 915 may be performed in accordance with examples as disclosed herein. In some examples, aspects of the operations of 915 may be performed by a messaging input component 735 as described with reference to FIG. 7.

At 920, the method may include broadcasting, via a blockchain network and based at least in part on the one or more inputs, a second message that is configured to transfer the crypto token to the second blockchain address of the second user. The operations of block 920 may be performed in accordance with examples as disclosed herein. In some examples, aspects of the operations of 920 may be performed by a transaction component 740 as described with reference to FIG. 7.

At 925, the method may include updating the first user interface to include a visual indication of the broadcasted second message via the blockchain network. The operations of block 925 may be performed in accordance with examples as disclosed herein. In some examples, aspects of the operations of 925 may be performed by a messaging component 725 as described with reference to FIG. 7.

Figure 10:
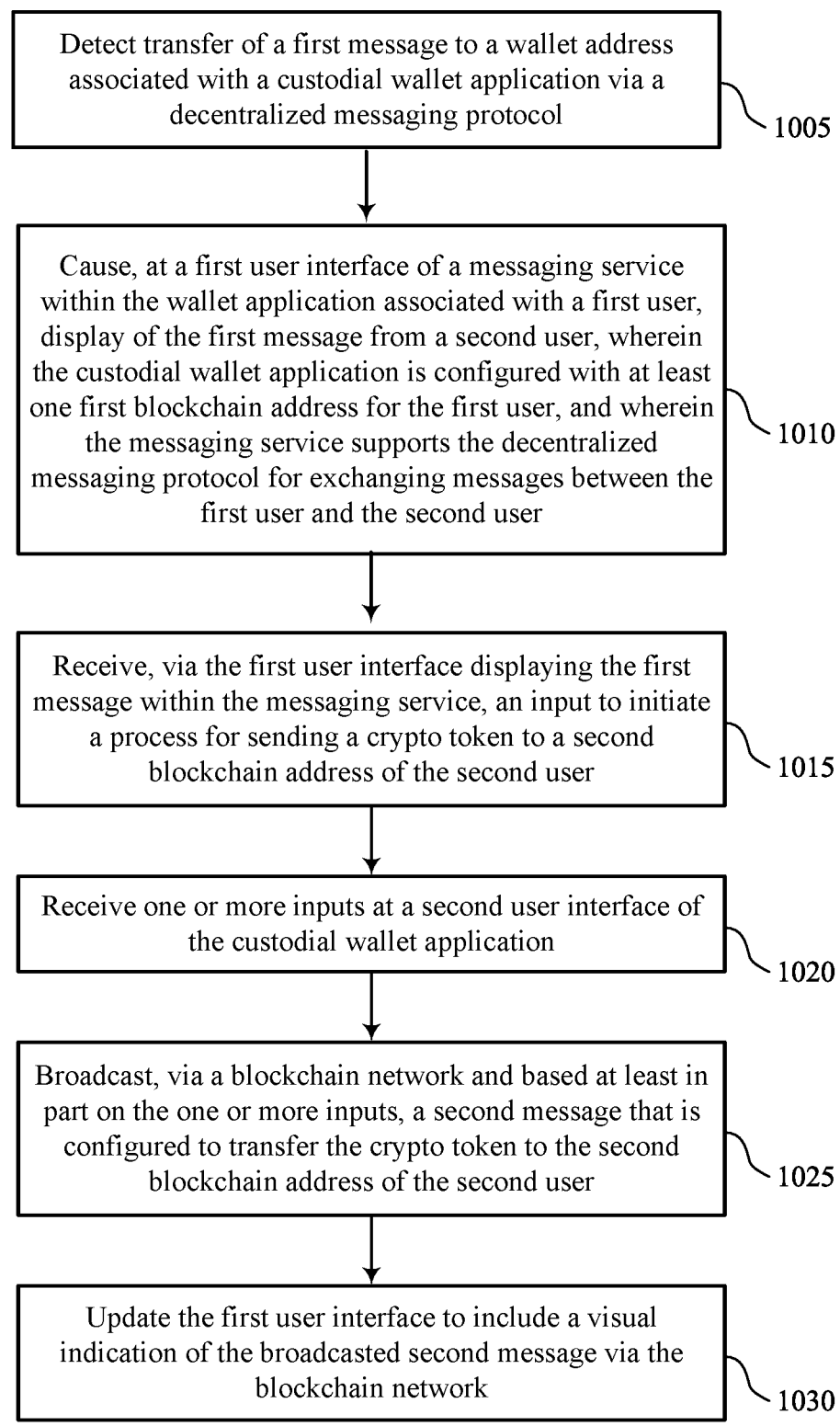

FIG. 10 shows a flowchart illustrating a method 1000 that supports token transfer via messaging service of wallet application in accordance with aspects of the present disclosure. The operations of the method 1000 may be implemented by a wallet application or its components as described herein. For example, the operations of the method 1000 may be performed by a wallet application as described with reference to FIGS. 1 through 8. In some examples, a wallet application may execute a set of instructions to control the functional elements of the wallet application to perform the described functions. Additionally, or alternatively, the wallet application may perform aspects of the described functions using special-purpose hardware.

At 1005, the method may include detecting transfer of a first message to a wallet address associated with a wallet application via a decentralized messaging protocol. The operations of block 1010 may be performed in accordance with examples as disclosed herein. In some examples, aspects of the operations of 1010 may be performed by a messaging component 725 as described with reference to FIG. 7.

At 1010, the method may include causing, at a first user interface of a messaging service within a wallet application associated with a first user, display of the first message from a second user, wherein the wallet application is configured with at least one first blockchain address for the first user, and wherein the messaging service supports the decentralized messaging protocol for exchanging messages between the first user and the second user. The operations of block 1005 may be performed in accordance with examples as disclosed herein. In some examples, aspects of the operations of 1005 may be performed by a messaging component 725 as described with reference to FIG. 7.

At 1015, the method may include receiving, via the first user interface displaying the first message within the messaging service, an input to initiate a process for sending a crypto token to a second blockchain address of the second user. The operations of block 1015 may be performed in accordance with examples as disclosed herein. In some examples, aspects of the operations of 1015 may be performed by a transaction input component 730 as described with reference to FIG. 7.

At 1020, the method may include receiving one or more inputs at a second user interface of the wallet application. The operations of block 1020 may be performed in accordance with examples as disclosed herein. In some examples, aspects of the operations of 1020 may be performed by a messaging input component 735 as described with reference to FIG. 7.

At 1025, the method may include broadcasting, via a blockchain network and based at least in part on the one or more inputs, a second message that is configured to transfer the crypto token to the second blockchain address of the second user. The operations of block 1025 may be performed in accordance with examples as disclosed herein. In some examples, aspects of the operations of 1025 may be performed by a transaction component 740 as described with reference to FIG. 7.

At 1030, the method may include updating the first user interface to include a visual indication of the broadcasted second message via the blockchain network. The operations of block 1030 may be performed in accordance with examples as disclosed herein. In some examples, aspects of the operations of 1030 may be performed by a messaging component 725 as described with reference to FIG. 7.

A method for crypto token management is described. The method may include causing, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user, receiving, via the first user interface displaying the first message within the messaging service, an input to initiate a process for sending a crypto token to a second blockchain address of the second user, receiving one or more inputs at a second user interface of the wallet application, broadcasting, via a blockchain network and based at least in part on the one or more inputs, a second message that is configured to transfer the crypto token to the second blockchain address of the second user, and updating the first user interface to include a visual indication of the broadcasted second message via the blockchain network.

An apparatus for crypto token management is described. The apparatus may include at least one processor, at least one memory coupled with the at least one processor, and instructions stored in the at least one memory. The instructions may be executable by the at least one processor to cause the apparatus to cause, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user, receive, via the first user interface displaying the first message within the messaging service, an input to initiate a process for sending a crypto token to a second blockchain address of the second user, receive one or more inputs at a second user interface of the wallet application, broadcast, via a blockchain network and based at least in part on the one or more inputs, a second message that is configured to transfer the crypto token to the second blockchain address of the second user, and update the first user interface to include a visual indication of the broadcasted second message via the blockchain network.

Another apparatus for crypto token management is described. The apparatus may include means for causing, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user, means for receiving, via the first user interface displaying the first message within the messaging service, an input to initiate a process for sending a crypto token to a second blockchain address of the second user, means for receiving one or more inputs at a second user interface of the wallet application, means for broadcasting, via a blockchain network and based at least in part on the one or more inputs, a second message that is configured to transfer the crypto token to the second blockchain address of the second user, and means for updating the first user interface to include a visual indication of the broadcasted second message via the blockchain network.

A non-transitory computer-readable medium storing code for crypto token management is described. The code may include instructions executable by a processor to cause, at a first user interface of a messaging service within a wallet application associated with a first user, display of a first message from a second user, wherein the wallet application is configured with at least one first blockchain address for the first user, and wherein the messaging service supports a decentralized messaging protocol for exchanging messages between the first user and the second user, receive, via the first user interface displaying the first message within the messaging service, an input to initiate a process for sending a crypto token to a second blockchain address of the second user, receive one or more inputs at a second user interface of the wallet application, broadcast, via a blockchain network and based at least in part on the one or more inputs, a second message that is configured to transfer the crypto token to the second blockchain address of the second user, and update the first user interface to include a visual indication of the broadcasted second message via the blockchain network.

In some examples of the method, apparatuses, and non-transitory computer-readable medium described herein, the second message may be configured to transfer the crypto token from a first blockchain address of the at least one first blockchain address.

Some examples of the method, apparatuses, and non-transitory computer-readable medium described herein may further include operations, features, means, or instructions for detecting transfer of the first message to a wallet address associated with the wallet application via the decentralized messaging protocol, wherein the first message may be displayed based at least in part on detecting transfer of the first message.

In some examples of the method, apparatuses, and non-transitory computer-readable medium described herein, the decentralized messaging protocol may be Extensible Message Transport Protocol (XMTP).

In some examples of the method, apparatuses, and non-transitory computer-readable medium described herein, the visual indication of the broadcasted second message includes an indication of a status of the second message and the status indicates whether the second message may be pending or complete on the blockchain network.

Some examples of the method, apparatuses, and non-transitory computer-readable medium described herein may further include operations, features, means, or instructions for receiving, via the wallet application, one or more second inputs that may be indicative of a third blockchain address associated with the first user and causing, at the first user interface, display of one or more third messages associated with the third blockchain address via the decentralized messaging protocol.

In some examples of the method, apparatuses, and non-transitory computer-readable medium described herein, the one or more second inputs comprise a seed phrase associated with the second blockchain address.

In some examples of the method, apparatuses, and non-transitory computer-readable medium described herein, the first user interface includes a user interface element that, when selected, causes display of a digital key board for inputting characters for a message.

Some examples of the method, apparatuses, and non-transitory computer-readable medium described herein may further include operations, features, means, or instructions for suggesting one or more users to message based at least in part on metadata associated with the wallet application.

In some examples of the method, apparatuses, and non-transitory computer-readable medium described herein, the metadata comprises one or more proof of attendance protocol (POAP) non-fungible tokens associated with the first blockchain address of the wallet application, a decentralized social graph, or a combination thereof.

Some examples of the method, apparatuses, and non-transitory computer-readable medium described herein may further include operations, features, means, or instructions for determining that the crypto token may be a crypto token type that may be transferrable without incurring transfer fees by a sender, wherein the second message may be configured to transfer the crypto token without deducting a fee from the first blockchain address associated with the first user based at least in part on the crypto token being the crypto token type.

Some examples of the method, apparatuses, and non-transitory computer-readable medium described herein may further include operations, features, means, or instructions for transmitting, via the decentralized messaging protocol, a third message to the second blockchain address, the third message including information associated with the second message broadcast via the blockchain network.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more." "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for crypto token management, comprising:
   causing, at a first user interface of a messaging service within a wallet application associated with a first user, display of a first message received from a second user via a decentralized messaging protocol, wherein the wallet application is configured with at least one first blockchain address for the first user, and wherein the messaging service supports the decentralized messaging protocol for exchanging messages between the first user and the second user;
   receiving, via the first user interface displaying the first message within the messaging service, an input to initiate a process for sending a crypto token to a second blockchain address of the second user;
   receiving one or more inputs at a second user interface of the wallet application;
   broadcasting, via a blockchain network and based at least in part on the one or more inputs, a second message that is configured to transfer the crypto token to the second blockchain address of the second user;
   updating the first user interface of the messaging service within the wallet application to display a visual indication of a transfer status of the crypto token via the blockchain network;
   receiving an input to switch from the at least one first blockchain address to a different blockchain address; and
   retrieving and displaying, via the messaging service, messages associated with the different blockchain address, wherein the messages associated with the different blockchain address are distinct from messages associated with the at least one first blockchain address.

2. The method of claim 1, wherein the second message is configured to transfer the crypto token from a first blockchain address of the at least one first blockchain address.

3. The method of claim 1, further comprising:
   detecting transfer of the first message to a wallet address associated with the wallet application via the decentralized messaging protocol, wherein the first message is displayed based at least in part on detecting transfer of the first message.

4. The method of claim 3, wherein the decentralized messaging protocol is Extensible Message Transport Protocol (XMTP).

5. The method of claim 1, further comprising:
   displaying, after broadcasting the second message, the first user interface that includes the visual indication that indicates that the transfer statusis pending on the blockchain network, and wherein updating the first user interface comprises:
   updating, after displaying the first user interface that includes the visual indication that indicates that the transfer status is pending, the visual indication of the broadcasted second message to indicate that transfer status is complete on the blockchain network.

6. The method of claim 1, further comprising:
   receiving, via the wallet application, one or more second inputs that are indicative of a third blockchain address associated with the first user; and
   causing, at the first user interface, display of one or more third messages associated with the third blockchain address via the decentralized messaging protocol.

7. The method of claim 6, wherein the one or more second inputs comprise a seed phrase associated with the third blockchain address.

8. The method of claim 1, wherein the first user interface includes a user interface element that, when selected, causes display of a digital keyboard for inputting characters for a message.

9. The method of claim 1, further comprising:
   suggesting one or more users to message based at least in part on metadata associated with the wallet application.

10. The method of claim 1, further comprising:
    suggesting the second user to message based at least in part on the at least one first blockchain address being associated with a non-fungible token and the second blockchain address being associated with the non-fungible token on the blockchain network.

11. The method of claim 1, further comprising:
    determining that the crypto token is a crypto token type that is transferrable without incurring transfer fees by a sender, wherein the second message is configured to transfer the crypto token without deducting a fee from the at least one first blockchain address associated with the first user based at least in part on the crypto token being the crypto token type.

12. The method of claim 1, further comprising:
transmitting, by the wallet application associated with the first user and via the decentralized messaging protocol, a third message to the second blockchain address, the third message including information associated with the second message broadcast via the blockchain network.

13. The method of claim 1, further comprising:
communicating with the blockchain network to determine the transfer status of the crypto token via the blockchain network, wherein the first user interface of the messaging service within the wallet application is updated to indicate whether the second message is pending, complete, or failed on the blockchain network.

14. The method of claim 1, further comprising:
determining that the crypto token is a crypto token type that is transferrable without incurring transfer fees by the first user; and
configuring the second message to transfer the crypto token without deducting a fee from the at least one first blockchain address based on the crypto token being the crypto token type.

15. An apparatus for crypto token management, comprising:
one or more memories storing processor-executable code; and
one or more processors coupled with the one or more memories and individually or collectively operable to execute the code to cause the apparatus to:
cause, at a first user interface of a messaging service within a wallet application associated with a first user, display of a first message received from a second user via a decentralized messaging protocol, wherein the wallet application is configured with at least one first blockchain address for the first user, and wherein the messaging service supports a decentralized messaging protocol for exchanging messages between the first user and the second user;
receive, via the first user interface displaying the first message within the messaging service, an input to initiate a process for sending a crypto token to a second blockchain address of the second user;
receive one or more inputs at a second user interface of the wallet application;
broadcast, via a blockchain network and based at least in part on the one or more inputs, a second message that is configured to transfer the crypto token to the second blockchain address of the second user;
update the first user interface of the messaging service within the wallet application to display a visual indication of a transfer status of the crypto token via the blockchain network;
receive an input to switch from the at least one first blockchain address to a different blockchain address; and
retrieve and display, via the messaging service, messages associated with the different blockchain address, wherein the messages associated with the different blockchain address are distinct from messages associated with the at least one first blockchain address.

16. The apparatus of claim 15, wherein the second message is configured to transfer the crypto token from a first blockchain address of the at least one first blockchain address.

17. The apparatus of claim 15, wherein the one or more processors are individually or collectively further operable to execute the code to cause the apparatus to:
detect transfer of the first message to a wallet address associated with the wallet application via the decentralized messaging protocol, wherein the first message is displayed based at least in part on detecting transfer of the first message.

18. The apparatus of claim 17, wherein the decentralized messaging protocol is Extensible Message Transport Protocol (XMTP).

19. A non-transitory computer-readable medium storing code for crypto token management, the code comprising instructions executable by a processor to:
cause, at a first user interface of a messaging service within a wallet application associated with a first user, display of a first message received from a second user via a decentralized messaging protocol, wherein the wallet application is configured with at least one first blockchain address for the first user, and wherein the messaging service supports the decentralized messaging protocol for exchanging messages between the first user and the second user;
receive, via the first user interface displaying the first message within the messaging service, an input to initiate a process for sending a crypto token to a second blockchain address of the second user;
receive one or more inputs at a second user interface of the wallet application;
broadcast, via a blockchain network and based at least in part on the one or more inputs, a second message that is configured to transfer the crypto token to the second blockchain address of the second user;
update the first user interface of the messaging service within the wallet application to display a visual indication of a transfer status of the crypto token via the blockchain network;
receive an input to switch from the at least one first blockchain address to a different blockchain address; and
retrieve and display, via the messaging service, messages associated with the different blockchain address, wherein the messages associated with the different blockchain address are distinct from messages associated with the at least one first blockchain address.

\* \* \* \* \*